United States Patent
Strei et al.

(10) Patent No.: US 10,627,302 B2
(45) Date of Patent: Apr. 21, 2020

(54) PRESSURE SENSOR MODULE FOR HIGH WORKING PRESSURE APPLICATIONS

(71) Applicant: Rosemount Inc., Shakopee, MN (US)

(72) Inventors: David M. Strei, Waconia, MN (US);
Mark G. Romo, Eden Prairie, MN (US)

(73) Assignee: Rosemount Inc., Shakopee, MN (US)

( * ) Notice: Subject to any disclaimer, the term of this patent is extended or adjusted under 35 U.S.C. 154(b) by 144 days.

(21) Appl. No.: 15/625,376

(22) Filed: Jun. 16, 2017

(65) Prior Publication Data

US 2018/0364124 A1    Dec. 20, 2018

(51) Int. Cl.
*G01L 19/00* (2006.01)
*G01L 9/00* (2006.01)
*G01L 19/04* (2006.01)

(52) U.S. Cl.
CPC ........ *G01L 19/0092* (2013.01); *G01L 9/0044* (2013.01); *G01L 19/04* (2013.01)

(58) Field of Classification Search
CPC .... G01L 19/0092; G01L 9/0044; G01L 19/04
See application file for complete search history.

(56) References Cited

U.S. PATENT DOCUMENTS

| | | |
|---|---|---|
| 4,163,395 A | 8/1979 | Medlar et al. |
| 4,612,812 A | 9/1986 | Broden |
| 4,841,776 A * | 6/1989 | Kawachi ............... G01L 13/025 73/706 |
| 7,624,642 B2 | 12/2009 | Romo |
| 8,448,519 B2 | 5/2013 | Broden et al. |
| 8,511,151 B2 | 8/2013 | Becher et al. |

(Continued)

FOREIGN PATENT DOCUMENTS

JP           201074582           3/2001

(Continued)

OTHER PUBLICATIONS

Lavreshin P. I. et al. Datchiki davleniya, Chast I. Uliyanovsky gosudarstvenny teknichesky universitet. Kafedra "IBK", Uliyanovsk, 2012, p. 16, lines 16-24, p. 37-40. 9 pages, Partial Machine Translation and Original.

(Continued)

*Primary Examiner* — David Z Huang
(74) *Attorney, Agent, or Firm* — Christopher R. Christenson; Kelly, Holt & Christenson PLLC (57) ABSTRACT

A differential pressure sensor module includes a base having a pair of process fluid pressure inlets and defining a sensor chamber having a sensor chamber inlet. A differential pressure sensor is disposed within the sensor chamber and has an inlet configured to receive a first pressure and provide a signal indicative of a difference between the first pressure and a sensor chamber pressure external to the differential pressure sensor within the sensor chamber. A pair of isolation diaphragms are provided in substantially the same plane, with each isolation diaphragm sealing a respective process fluid pressure inlet. A first fluid passageway is operably coupled to one of the isolation diaphragms and the inlet of the differential pressure sensor. A second fluid passageway is operably coupled to the other of the isolation diaphragms and to the sensor chamber inlet. An overpressure protection feature is operably coupled to the sensor chamber, the first fluid passageway and the second fluid passageway.

23 Claims, 8 Drawing Sheets

(56) References Cited

U.S. PATENT DOCUMENTS

| | | | |
|---|---|---|---|
| 2005/0034523 A1 | 2/2005 | Casimiro et al. | |
| 2006/0162460 A1* | 7/2006 | Ooshiba | G01L 13/025 73/716 |
| 2011/0303023 A1 | 12/2011 | Becher et al. | |
| 2011/0320142 A1 | 12/2011 | Surman et al. | |
| 2013/0160560 A1 | 6/2013 | Strei et al. | |
| 2014/0373635 A1 | 12/2014 | Seeberg et al. | |
| 2015/0062893 A1 | 3/2015 | Haywood | |
| 2015/0082903 A1 | 3/2015 | Strei | |
| 2017/0069793 A1 | 3/2017 | Fetisov et al. | |

OTHER PUBLICATIONS

International Search Report and Opinion for International Patent Application No. PCT/RU2015/000632, dated Jun. 23, 2016, 8 pages.
"Pressure Transmitters—Providing the best measurement system solution", retrieved from http://www.fujielectric.com/products/instruments/prosucts/transmitter/top.html, retrieved on Jun. 10, 2016, 2 pages.
Araki et al. "A deep sea differential pressure gauge", Frontier Research on Earth Evolution, vol. 2 ( IFREE), 5 pages.
Cox et al. "A Deep-Sea Differential Pressure Gauge", American Meteorological Society, dated Sep. 1984, 10 pages.
International Search Report and Written Opinion, dated Sep. 19, 2018, for International Patent Application No. PCT/US2018/035062, 20 pages.
First Chinese Office Action dated Feb. 3, 2020, for Chinese Patent Application No. 201710576669.2, 28 pages including English translation and comments.

* cited by examiner

PRESSURE SENSOR MODULE FOR HIGH WORKING PRESSURE APPLICATIONS

BACKGROUND

Pressure transmitters are commonly used in industrial processes to measure pressures in various industrial process fluids, such as slurries, liquids, vapors and gases of chemical, pulp, petroleum, gas, pharmaceutical, food and other fluid-type processing plants.

Differential pressure transmitters generally include a pair of process fluid pressure inputs which are operably coupled to a differential pressure sensor (within the differential pressure transmitter) that responds to the difference in pressure between the two inputs. Differential pressure transmitters typically include a pair of isolator diaphragms that are positioned in the process fluid inlets and isolate the differential pressure sensor from the harsh fluids being sensed. Pressure is transferred from the process fluid to the differential pressure sensor through a substantially incompressible fill fluid carried in a passageway extending from each isolator diaphragm to the differential pressure sensor.

Several common types of process fluid flow measurement devices (i.e., flowmeters) employ a variety of different technologies (venturi, orifice plate, v-cone, etc.) that utilize differential pressure measurements as a core technology in order to enable the flow measurement. The differential pressure measurements are typically in the range of 0-75 psi.

Flowmeters relying on differential pressure are common in the oil and gas industry. As off-shore oil drilling employs such differential pressure measurements for measuring pressure in deeper waters, the average pressure of oil coming out of the well increases. Currently, oil and gas companies are attempting to develop technologies that will work with a maximum pressure of 20,000 psi. Accurately measuring a differential pressure in the range of 0-75 psi between two sources with an average pressure that can be as high as 20,000 psi is very challenging.

Providing a pressure sensor module adapted for high working pressure applications, such as sub-sea environments, without requiring extensive modification or expense will facilitate the more widespread adaption and utilization of differential pressure sensors in such applications and will improve the processes that employ such technology.

SUMMARY

A differential pressure sensor module includes a base having a pair of process fluid pressure inlets and defining a sensor chamber having a sensor chamber inlet. A differential pressure sensor is disposed within the sensor chamber and has an inlet configured to receive a first pressure and provide a signal indicative of a difference between the first pressure and a sensor chamber pressure external to the differential pressure sensor within the sensor chamber. A pair of isolation diaphragms are provided in substantially the same plane, with each isolation diaphragm sealing a respective process fluid pressure inlet. A first fluid passageway is operably coupled to one of the isolation diaphragms and the inlet of the differential pressure sensor. A second fluid passageway is operably coupled to the other of the isolation diaphragms and to the sensor chamber inlet. An overpressure protection feature is operably coupled to the sensor chamber, the first fluid passageway and the second fluid passageway.

DETAILED DESCRIPTION OF ILLUSTRATIVE EMBODIMENTS

When the pressure loading on a differential pressure sensor is not uniform, the differential pressure sensor output can vary with line pressure. This is undesirable as any variation that is not a function of differential pressure is error. Embodiments described herein reduce or eliminate the effect of varying line pressure on a differential pressure sensor.

Figure 1:
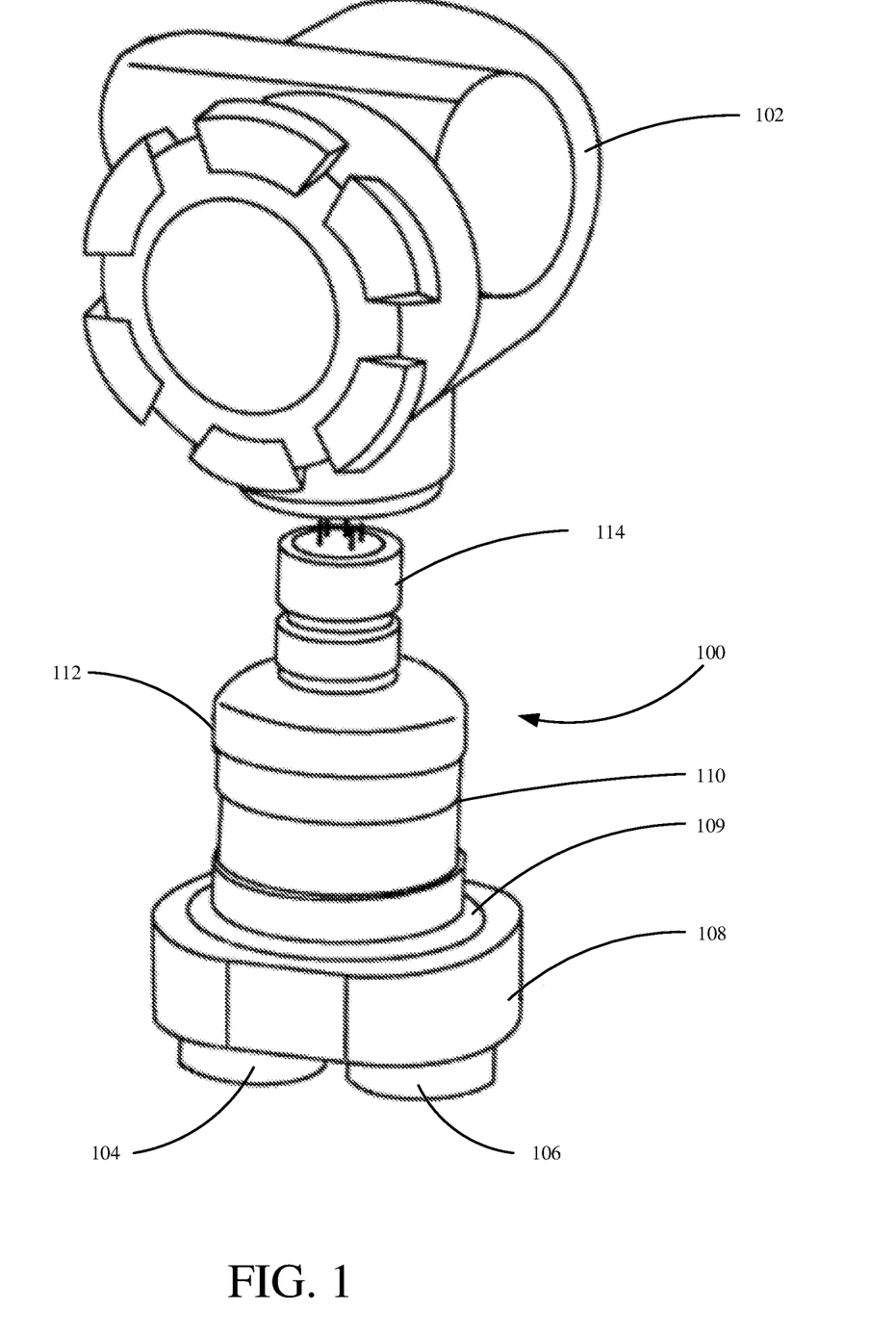
FIG. 1 is a diagrammatic view of a coplanar differential pressure sensor module and an electronics housing with which embodiments of the present invention are particularly useful.

FIG. 1 is a diagrammatic view of a coplanar differential pressure sensor module 100 with which embodiments of the present invention are particularly applicable. Sensor module 100 is couplable to electronics enclosure 102 and can measure differential pressure introduced at a pair of process fluid pressure inlets 104, 106. Electronics enclosure 102 may contain suitable electronics circuitry to communicate process fluid pressure obtained from module 100 to another device or a control room. Base portion 108 of differential pressure sensor module 100 may, in some instances, be constructed from a material that is suitable for direct immersion in salt water. One example of such a material is alloy C276 available from Haynes International Inc., of Kokomo, Ind. under the trade designation Hastelloy C276. However, this material is relatively expensive and thus in order to reduce material costs for some embodiments of the present invention, the entire coplanar differential pressure sensor module is designed to use as little of this costly alloy as possible. Additionally, base portion 108 may include an annular ring 109 that is sized and shaped to receive a sub-sea rated housing or endcap and be welded thereto. In this manner, portion 108 may, in some instances, be formed of the same material as that of existing sub-sea housings, such as alloy C276.

As illustrated in FIG. 1, base portion is relatively small and may, in some instances, have a diameter of approximately four inches. Coplanar differential pressure sensor module 100 also includes a sidewall 110 coupled to base portion 108, which sidewall 110 couples to cap 112. An electrical feedthrough connector 114 is couplable to electronics enclosure 102 and includes conductors to provide power to module 100 as well as bidirectional communication. In some instances, module 100 may communicate over the same conductors through which it is powered.

Figure 2:
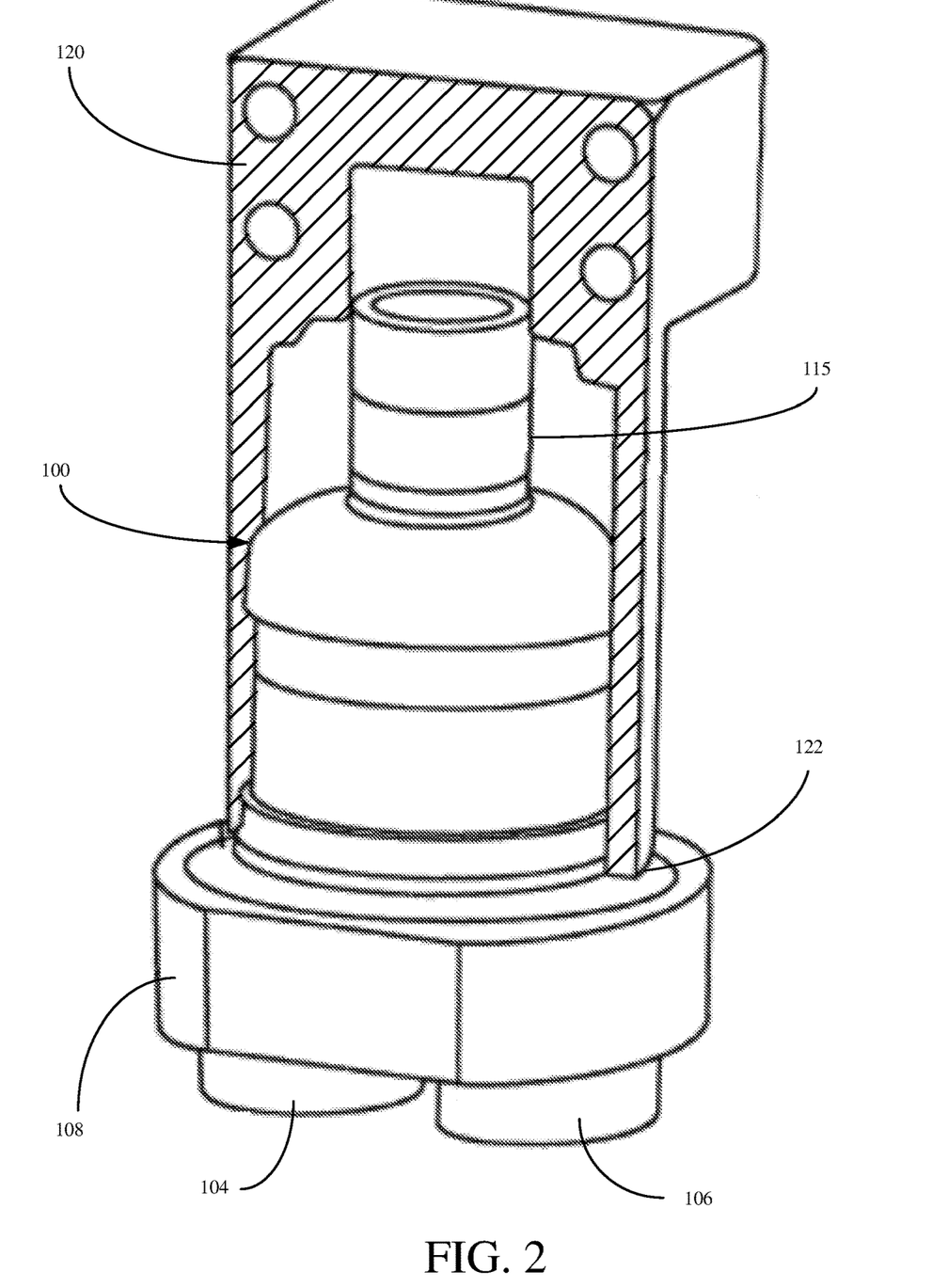
FIG. 2 is a diagrammatic partial cross-sectional view of a coplanar differential pressure sensor module adapted for sub-sea use.

FIG. 2 is a diagrammatic view of coplanar differential pressure sensor module 100 (illustrated in FIG. 1) adapted for direct immersion in sea water. Specifically, the upper portion of coplanar differential pressure sensor module 100, proximate electrical connection point 115, is covered with a high pressure bearing endcap 120 that is constructed from a material that is suitable for direct immersion in sea water, such as alloy C276. Endcap 120 is preferably constructed from the same material as bottom portion 108 of coplanar differential pressure sensor module 100. For example, if bottom portion 108 of module 100 is constructed from alloy C276, it is preferred that endcap 120 also be constructed from alloy C276. As can be appreciated from FIG. 2, coplanar differential pressure sensor module 100 can be adapted for direct immersion in sea water relatively easily by simply welding endcap 120 directly to lower portion 108 at interface 122. Additionally, the entire assembly, in this example, is still relatively small thereby conserving the amount of material constructed from this expensive alloy.

Figure 3:
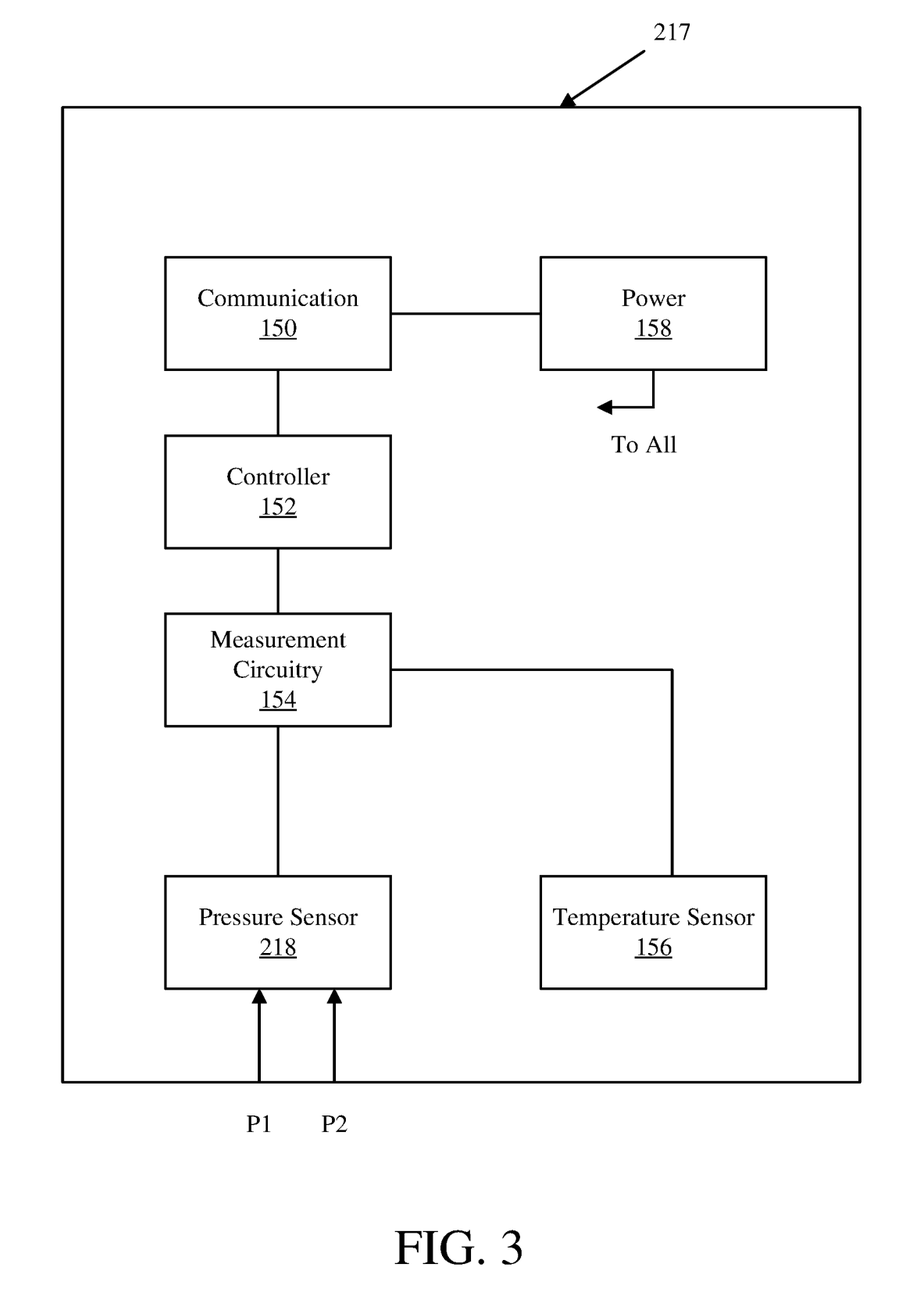
FIG. 3 is a block diagram of a differential pressure sensor module in accordance with an embodiment of the present invention.

FIG. 3 is a block diagram of circuitry 217 within a differential pressure sensor module. Circuitry 217 includes power module 158 and communication module 150, each of which may be coupled to a process communication loop or segment. In one embodiment, power module 158 receives energy from the process communication loop and provides electrical power to all components of circuitry 217. Communication module 150 is coupled to controller 152 such that communication module 150 provides data to controller 152 indicative of process communication signals received from the process communication loop or segment.

Communication module 150 can be any suitable device that is adapted to generate suitable signals on process communication loop in accordance with a process communication industry standard protocol. Suitable examples of such process industry communication protocols include the Highway Addressable Remote Transducer (HART®) protocol, the FOUNDATION™ Fieldbus protocol, or wireless process communication protocols, such as IEC 62591. Additionally, circuitry 217, by virtue of cooperation between power module 158 and communication module 150, is able to communicate, at least in some embodiments, over the same communication media from which it receives power.

Controller 152 is any suitable device that is able to execute a series of programmatic instructions to provide a control or monitoring function. In one embodiment, controller 152 is a microprocessor. Controller 152 is coupled to measurement circuitry 154, which is coupled to differential pressure sensor 218 and temperature sensor 156. Measurement circuitry 154 includes suitable circuitry to measure one or more varying electrical characteristic(s) of differential pressure sensor 218 and temperature sensor 156 and provide data to controller 152 indicative of differential pressure (P2−P1) as well as a temperature detected by temperature sensor 156. Temperature sensor 156 is, in some embodiments, disposed proximate circuitry 217 and provides an indication of temperature within the housing of the pressure transmitter. Temperature sensor 156 can be any suitable device that is able to provide a signal related to temperature including, without limitation, a resistance temperature device (RTD), thermocouple, or thermistor. Temperature sensor 156 may also be a temperature reading made using a temperature dependent characteristic of the pressure sensor, such as the bridge resistance of a strain gauge pressure sensor. Preferably, measurement circuitry 154 includes at least one analog-to-digital converter adapted to convert an electrical characteristic of each of differential pressure sensor 218 and temperature sensor 156, such as resistance, to digital data that is transmitted to controller 152.

Figure 4:
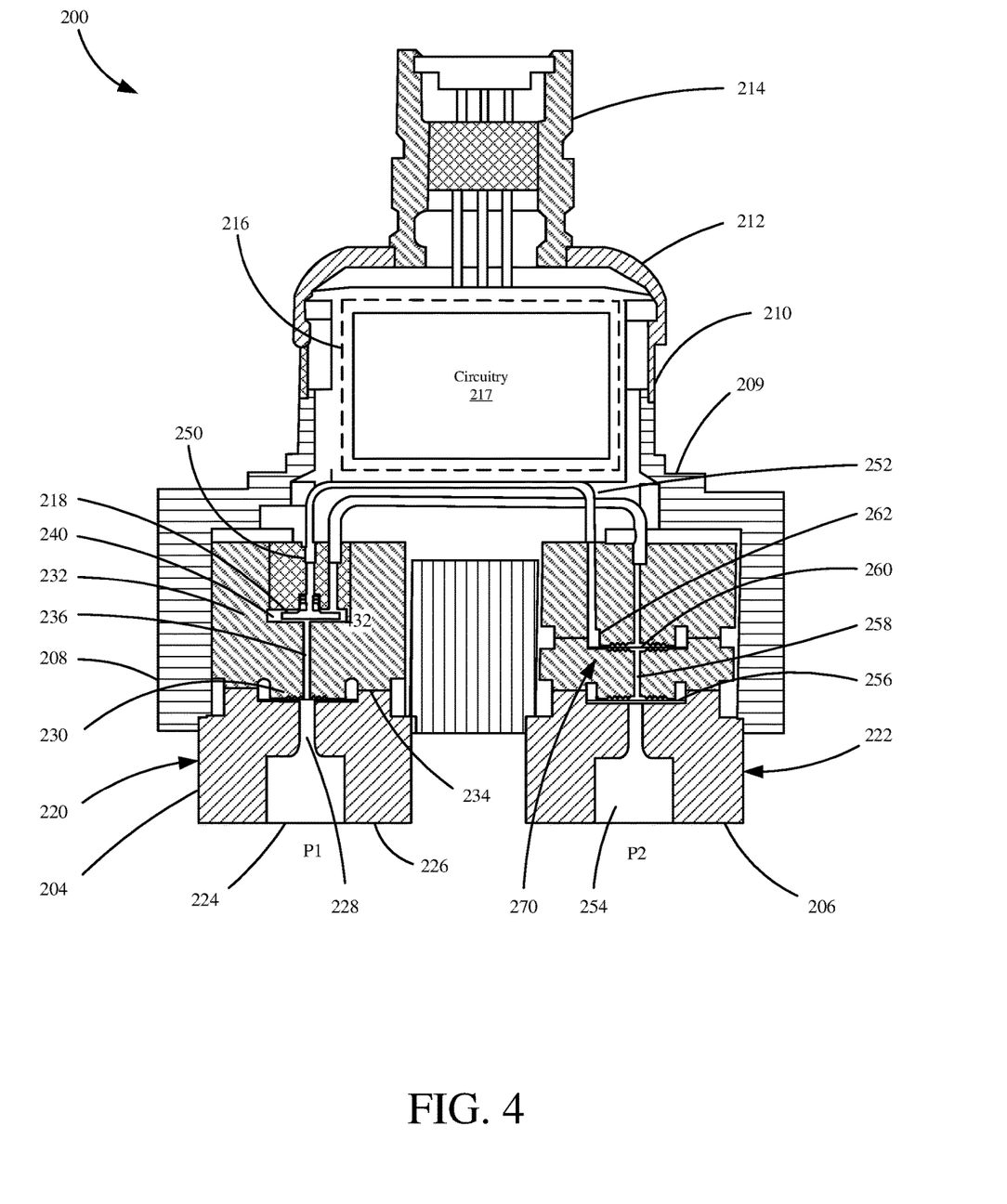
FIG. 4 is a diagrammatic cross sectional view of a coplanar differential pressure sensor module in accordance with an embodiment of the present invention.

FIG. 4 is a diagrammatic cross sectional view of a coplanar differential pressure sensor module in accordance with an embodiment of the present invention. Module 200 bears some similarities to module 100 (described with respect to FIG. 1) and like components are numbered similarly. Feedthrough connector 214 is coupled to endcap 212 that is attached to sidewall 210. Sidewall 210 and endcap 212 cooperate to define housing 216 for sensor electronics 217 (shown in FIG. 3). Sensor electronics 217 can be any suitable electronics that are able to couple to differential pressure sensor 218 and obtain a useful electrical signal from differential pressure sensor 218. In one embodiment, differential pressure sensor 218 is a silicon strain gauge pressure sensor. However, other types of pressure sensors, such as those that employ capacitive sensing can be used for differential pressure sensor 218 as well. Additionally, electronics 217 can be used to amplify, linearize and/or compensate the differential pressure sensor signal.

As shown in FIG. 4, module 200 includes a pair of isolation assemblies 220, 222 disposed within base portion 208. Isolation assembly 220 includes process fluid inlet 224 that is configured to receive a process fluid. For example, inlet 224 may have internal threads that are configured to receive a suitable fitting. Process fluid connector 226 includes a process fluid passageway 228 that is sealed by an isolation diaphragm 230. Process fluid connector 226 is coupled to isolation plug 232 via a suitable mechanical connection, such as a weld at interface 234. Isolation diaphragm 230 contacts the process fluid and pressure of the process fluid moves isolation diaphragm 230. A fill fluid on the opposite side of isolation diaphragm 230 is conveyed through passageway 236 to chamber 240 where it completely immerses differential pressure sensor 218. This provides a highly uniform pressure loading on differential pressure sensor 218. Thus, while the working (line) pressure may be very high (e.g. 20,000 psi) the differential pressure sensor can be selected to provide any suitable differential pressure range, such as, ±5 psi, ±30 psi, ±75 psi, ±800 psi, or ±4000 psi. Accordingly, some embodiments of the present invention support a working pressure of about 20,000 psi. Embodiments of the present invention can be practiced with a working pressure in the range of about 10,000 psi-20,000 psi. Still other embodiments of the present invention may support a working pressure in excess of 20,000 psi.

Accordingly, process fluid pressure P1 moves isolation diaphragm 230 thereby causing movement of fill fluid through passageway 236 which then deforms or otherwise physically affects differential pressure sensor 218, which effect is then measurable electronically with suitable electronics within sensor electronics housing 216. As can be seen in FIG. 4, a second fluidic connection 250 to differential pressure sensor 218 is operably coupled via line 252 to isolation assembly 206. Thus, pressure P2 acting at pressure inlet 254 impacts isolation diaphragm 256 and thus moves fill fluid within passageway 258. The fluid passageway 258 is in direct communication with volume 262 and deflects diaphragm 260. This pressurized fluid is then conveyed through line 252 to differential pressure sensor 218. In this way, differential pressure sensor 218 responds to a difference in process fluid pressures P1 and P2.

As shown in FIG. 4, coplanar differential pressure sensor module 200 includes an overpressure protection feature 270 that will be described below in greater detail with respect to FIGS. 6-8. In accordance with an embodiment of the present invention, differential pressure sensor 218 has a pressure rating that is less than a working pressure rating for the pressure sensor module, In one embodiment, the working pressure rating for the pressure sensor module is 20,000 psi and the pressure rating for differential pressure sensor 218 is less than that rating. In order to protect the differential pressure sensor, an overpressure protection feature is employed to protect differential pressure sensor 218 from damage when overpressure events occur. In one embodiment, the overpressure protection mechanism 270 is provided in the form of an overpressure protection diaphragm 260 that has a larger displacement than the displacement of isolating diaphragms 230, 256, which allows the isolating diaphragms to essentially bottom out when the applied differential pressure is larger than the overpressure rating of the differential pressure sensor 218. This design also separates the overpressure protection provision from the differential pressure sensor thereby allowing for relatively smaller components to be arranged in the coplanar configuration for pressure connections. This design also separates the pressure retaining components from the sensor, enabling the different pressure modules with different maximum working pressure ratings to utilize the same sensor and circuitry.

As can be seen in FIG. 4, important aspects of the illustrated embodiment include a single housing enclosing differential pressure sensor 218, isolating diaphragm assemblies, the oil fill system, and electronics 217 within housing 216. Additionally, this housing also includes an attachment point 209 for sub-sea housings. In one embodiment, the isolation diaphragms 230, 256 have a relatively small diameter on the order of or less than 0.5 inches. Additionally, the differential pressure sensor 218 is completely immersed within the fill fluid inside chamber 240. Further, the embodiment shown in FIG. 4 includes an integrated differential pressure overprotection feature 270. The relatively small size and single housing effectively keep electronics within housing 216, sensor 218, and the oil fill system at similar temperatures. This simplifies temperature compensation of the entire system as a simple temperature sensor disposed within housing 216 can be used to provide a thermal indication that is relatively accurate for the entire assembly. The relatively small size also enables the design to be easily modified for sub-sea use by simply welding on an appropriate housing (such as that shown in FIG. 2).

Using the relatively smaller isolation diaphragms as described above enables important additional design features that facilitate improvements in the coplanar differential pressure sensor module. For example, closer spacing of process connections, differential pressure sensor and electronics are facilitated as well as providing a reduction in fill fluid volumes. These features facilitate ambient temperature compensation for the entire assembly. Additionally, the relatively smaller diameters result in a smaller pressure-bearing surface, which generates lower forces in the pressure containment structures (such as the oil fill system around the sensor and the area between the isolator and the process connector). These lower forces may result in the ability to use thinner walls which can then be welded using full-penetration welds and do not require additional supports such as large bolted flanges. Accordingly, this smaller design can be implemented using an all-welded construction.

Figure 5:
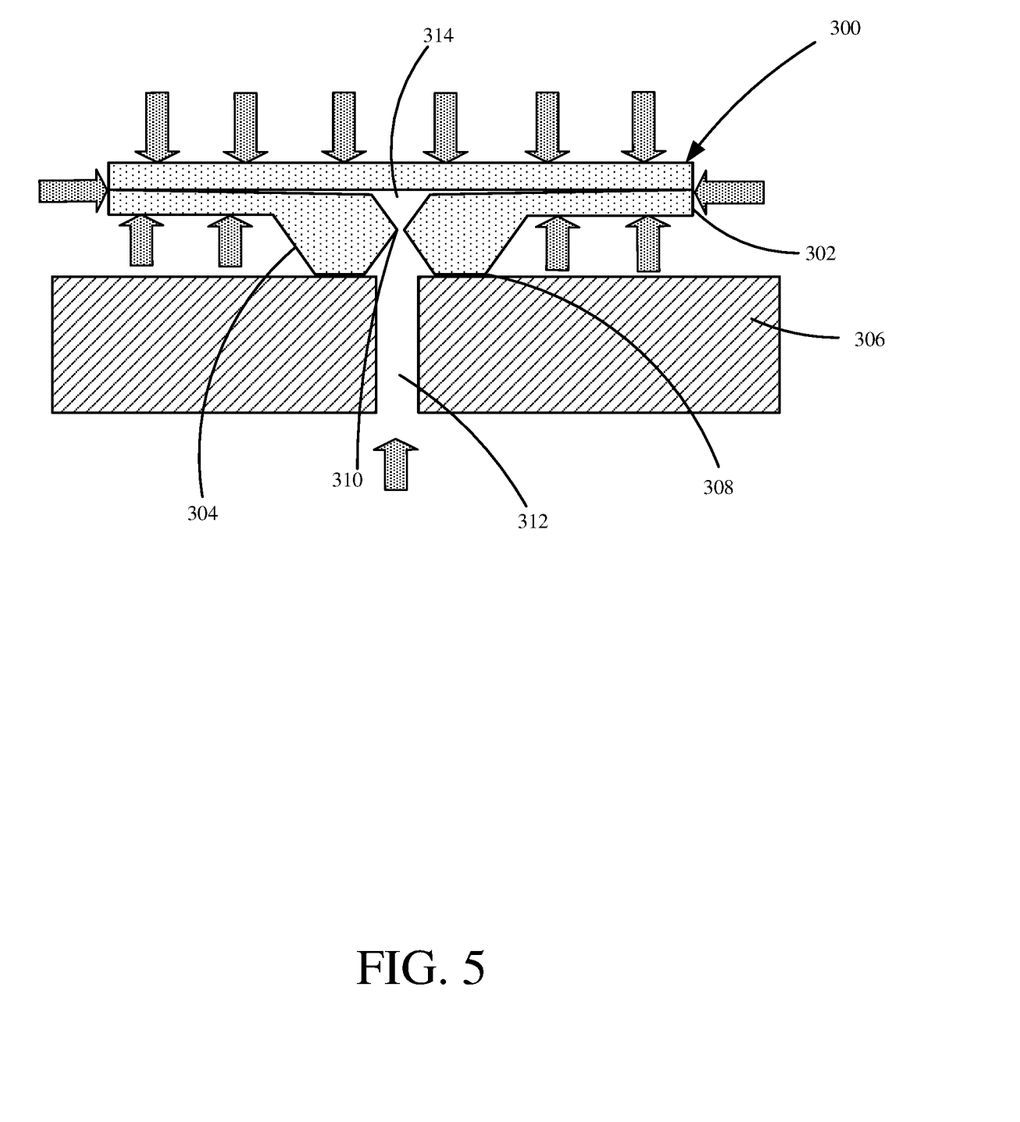
FIG. 5 is a diagrammatic cross sectional view of a differential pressure sensor mounted to a sensor mount and experiencing a differential pressure between a high side pressure and a reference pressure in accordance with an embodiment of the present invention.

FIG. 5 is a diagrammatic enlarged view of a differential pressure sensor with which embodiments of the present invention are particularly useful. In comparison to differential pressure sensor 218 (shown in FIG. 4) sensor 300 is essentially upside down. Sensor 300 includes a base portion 302 that includes a pedestal 304 that is sealingly attached to sensor mount 306 at interface 308. As shown, pedestal 304 includes an aperture 310 that is in fluidic communication with passageway 312 of sensor mounting surface 306. Aperture 310 allows the reference or low side pressure to access the interior 314 of differential pressure sensor 300. As shown in FIG. 5, the high side pressure acts around substantially all external surfaces of differential pressure sensor 300 against the reference pressure (fluidically coupled to interior 314) to deflect the sensor diaphragm. Electrical features disposed on or in pressure sensor 300 deform or otherwise change position in a way that can be detected electrically. Suitable circuitry detects this change and provides a sensor output. In one example, sensor 300 is formed of silicon with a strain gauge operably coupled thereto. However, embodiments of the present invention can include utilization of capacitance-based sensing with capacitive plates, coupled to or disposed within differential pressure sensor 300.

As can be appreciated, since differential pressure sensor 300 may be formed out of silicon, it may have well-defined pressure ratings beyond which operation may damage the sensor or not provide a reliable output. Accordingly, some embodiments of the present invention provide an overpressure protection feature that ensures that the silicon-based differential pressure sensor is not subjected to overpressure events that could damage it or otherwise affect its operation. Additionally, reference pressure can be any suitable reference pressure including, without limitation: a vacuum thereby converting the overall measurement to an absolute pressure application; an atmospheric pressure thereby converting the overall measurement to a gauge pressure application; or a low side pressure (such as that shown in FIG. 4), where a differential pressure application is provided.

The pressure sensor arrangement shown in FIG. 5 has the benefit of having very low line pressure effects. For a differential pressure (DP) sensor, the output should only change relative to the difference between the high side and the low side pressure. The output of the DP sensor should not respond to a common-mode change in pressure to both the high side and low side pressure. This common mode change in pressure is called line pressure. Because the sensor shown in FIG. 5 will only see a change in hydrostatic pressure as the line pressure increases, no changes in the shape of the sensor or the deflection of the diaphragm will occur as a result of a change in line pressure, resulting in no change in sensor output with line pressure.

Figure 6:
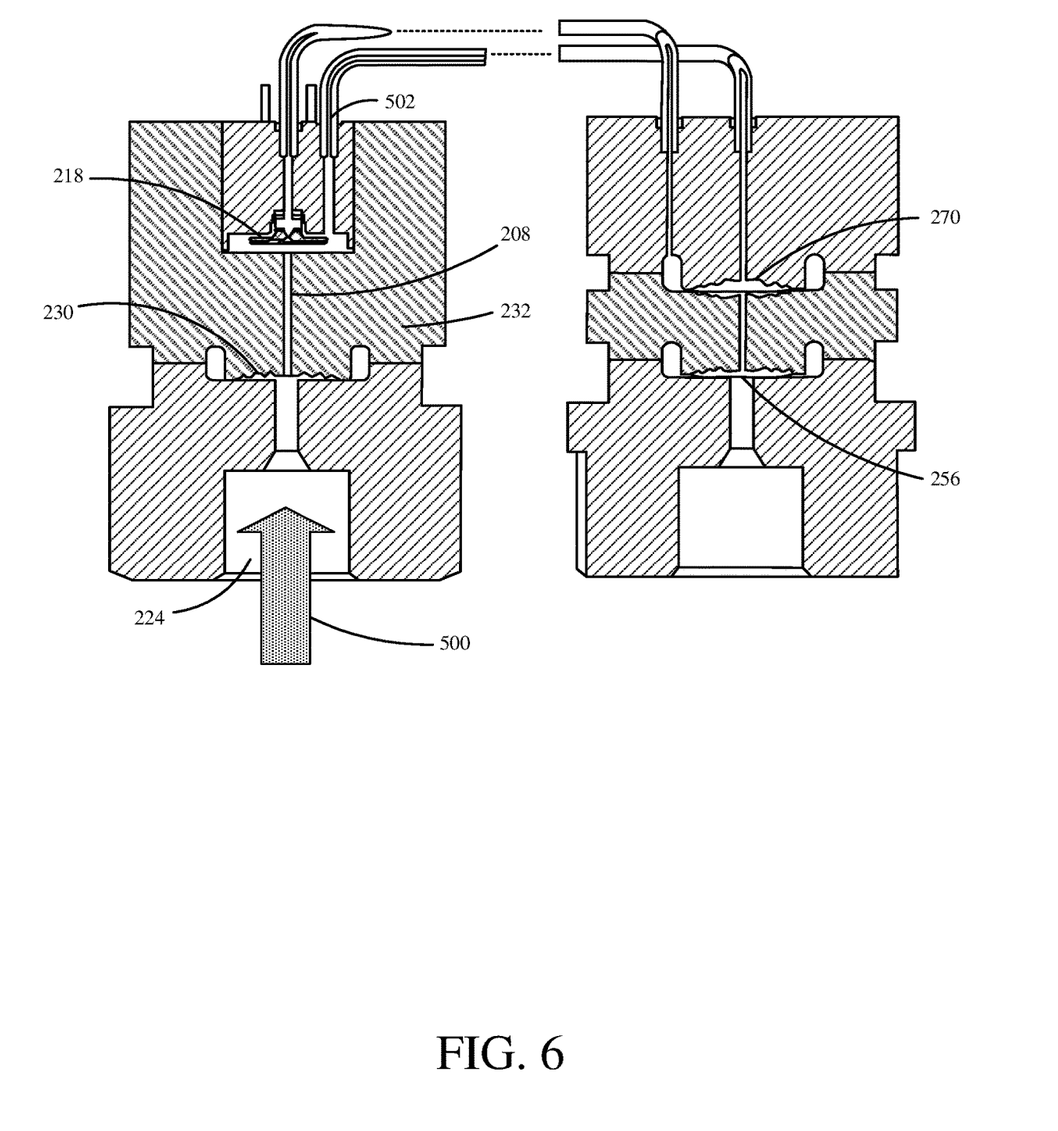
FIG. 6 is a diagrammatic cross sectional view of a portion of a coplanar pressure sensor module employing an overpressure protection mechanism in accordance with an embodiment of the present invention.
Figure 7:
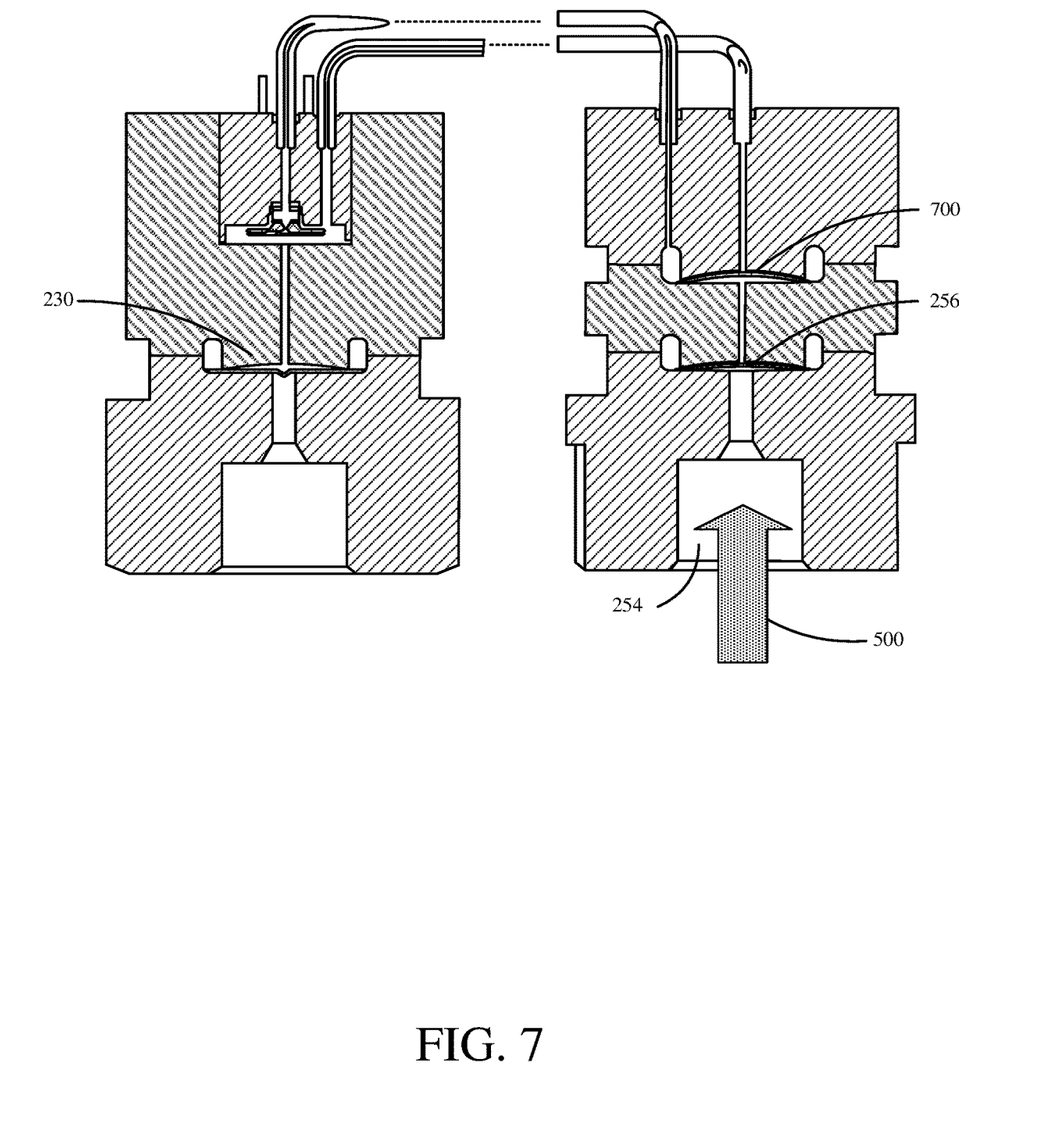
FIG. 7 is another diagrammatic view of a portion of a coplanar differential pressure sensor module employing an overpressure protection mechanism in accordance with an embodiment of the present invention.

FIG. 6 is a diagrammatic view of a portion of a coplanar differential pressure sensor module having an overpressure protection feature in accordance with an embodiment of the present invention. For clarity, the transmitter housing and electronics are not shown in FIG. 6.

FIG. 6 shows an overpressure (illustrated diagrammatically at arrow 500) being applied to process fluid pressure port 224. When this occurs, isolation diaphragm 230 is urged completely against and contacts isolation plug 232. Accordingly, isolation diaphragm 230 is considered to be bottomed out. However, as can be seen, process fluid within passageway 208 is also in fluidic communication with overpressure protection diaphragm 270 by virtue of overpressure protection fluid conduit 502. This allows overpressure protection diaphragm 270 to deform further to allow the isolation diaphragm 230 to bottom out and isolation diaphragm 256 to become fully extended. Once isolation diaphragm 230 is bottomed out, any additional pressure will not be conveyed to differential pressure sensor 218. Similarly, FIG. 7 shows an overpressure 500 being applied to process fluid pressure port 254 thereby causing isolation diaphragm 256 to bottom out. In this scenario, overpressure protection diaphragm 270 is urged toward the high side, which causes isolation diaphragm 230 to be extended. In the overpressure situations shown in FIGS. 6 and 7, pressure to differential pressure sensor 218 is maintained below a pressure rating of the differential pressure sensor by a suitably designed overpressure protection diaphragm, thereby preventing damage or other undesirable effects to the differential pressure sensor. A suitably designed overpressure protection diaphragm is stiff enough to prevent bottoming out of either isolator diaphragms before the maximum differential pressure of the sensor is reached.

Figure 8:
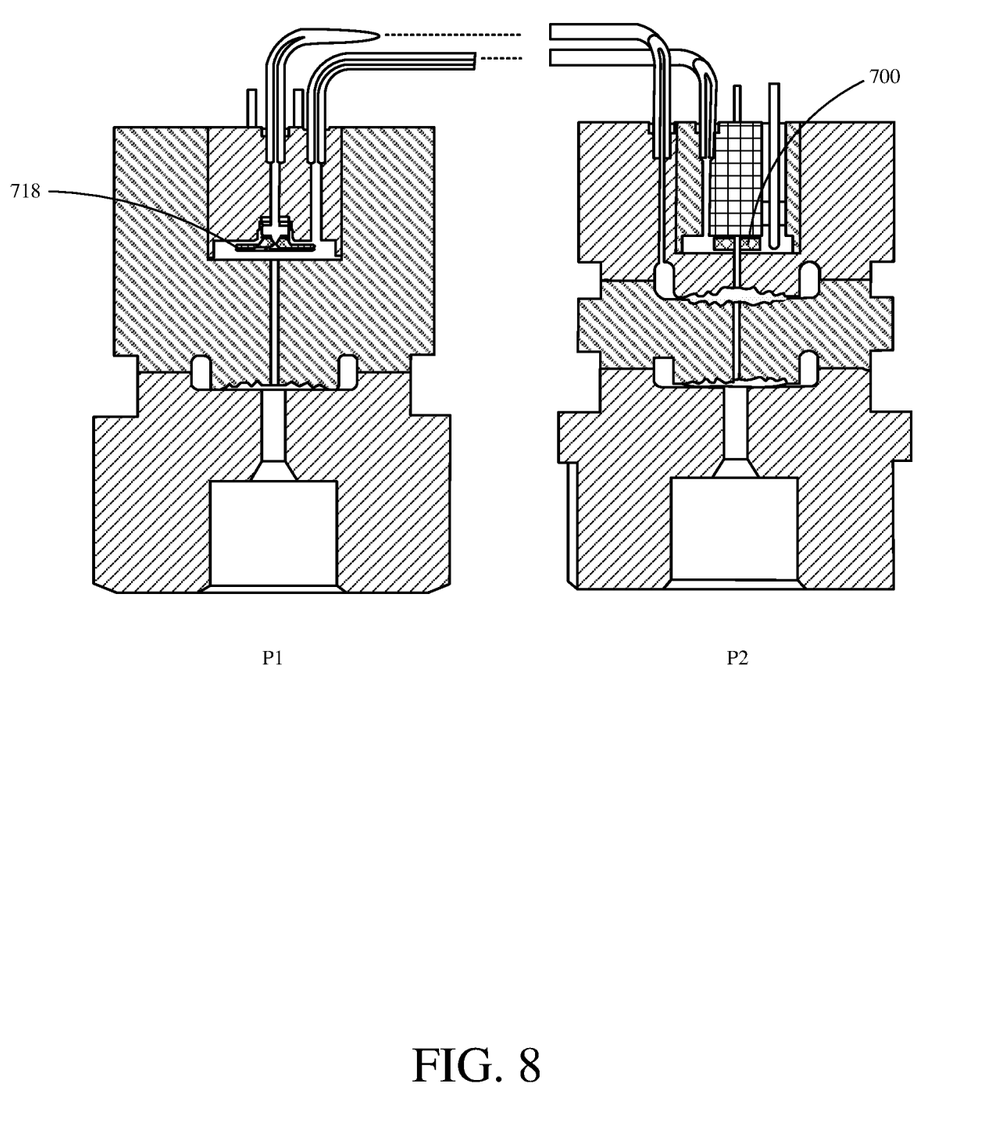
FIG. 8 is a diagrammatic cross sectional view of a portion of a coplanar differential pressure sensor module employing an overpressure protection module in combination with a line pressure sensor in accordance with an embodiment of the present invention.

FIG. 8 is a diagrammatic view of a portion of a coplanar differential pressure sensor module in accordance with another embodiment of the present invention. Some aspects of the embodiment shown in FIG. 8 are similar to those of FIGS. 6 and 7, and like components are numbered similarly. With respect to FIG. 8, the difference between the embodiment shown in that figure and the previous embodiments is the inclusion of a discrete line pressure sensor 700. Accordingly, while differential pressure sensor 718 provides a direct indication of a difference in pressure between pressure P1 and pressure P2, pressure sensor 700 provides a direct indication of the line pressure. This may be useful to provide a warning or compensation as the line pressure approaches and even exceeds selected pressure ratings. Further, while the embodiment shown in FIG. 8 shows a single line pressure sensor 700, it is expressly contemplated that multiple such sensors could be employed for redundancy, as well as the ability to provide a redundant indication of differential pressure in order to validate or substitute for the reading from differential pressure sensor 718, in the event that differential pressure sensor 718 is damaged.

Although the present invention has been described with reference to preferred embodiments, workers skilled in the art will recognize that changes may be made in form and detail without departing from the spirit and scope of the invention. For example, while embodiments described herein are particularly suited for flow-related applications, replacing the low differential pressure sensor with a higher range differential pressure sensor would enable additional applications, such as measuring the differential pressure across a filter element.

What is claimed is:

1. A differential pressure sensor module comprising:
a base defining a sensor chamber with a sensor chamber inlet, the base also having a pair of process fluid pressure inlets;
a differential pressure sensor disposed within the sensor chamber and having an inlet configured to receive a first pressure and provide a signal indicative of a difference between the first pressure and a sensor chamber pressure external to the differential pressure sensor within the sensor chamber;
a pair of isolation diaphragms disposed in substantially the same plane, each sealing a respective process fluid pressure inlet;
a first fluid passageway operably coupled to one of the isolation diaphragms and the inlet of the differential pressure sensor;
a second fluid passageway operably coupled to the other of the isolation diaphragms and to the sensor chamber inlet, the second fluid passageway containing a fill fluid in fluidic communication with the other of the isolation diaphragms and the sensor chamber; and
an overpressure protection diaphragm fluidically coupled to the first fluid passageway and the second fluid passageway, wherein the overpressure protection diaphragm has a larger displacement than at least one of the isolation diaphragms.

2. The differential pressure sensor module of claim 1, wherein the differential pressure sensor module has a working pressure rating beyond a pressure rating of the differential pressure sensor.

3. The differential pressure sensor module of claim 2, wherein the differential pressure sensor module has a working pressure rating of 20,000 psi.

4. The differential pressure sensor module of claim 2, wherein the differential pressure sensor module has a working pressure rating in the range of 10,000 psi to 20,000 psi.

5. The differential pressure sensor module of claim 2, wherein the differential pressure sensor module has a working pressure rating greater than 20,000 psi.

6. The differential pressure sensor module of claim 1, and further comprising a housing coupled to the base, the housing containing the differential pressure sensor, the pair of isolation diaphragms, a fill fluid disposed in the first and second fluid passageways, and electronics.

7. The differential pressure sensor module of claim 6, wherein the differential pressure sensor module is all welded.

8. The differential pressure sensor module of claim 7, wherein the base portion includes an annular surface configured to receive a high pressure bearing endcap.

9. The differential pressure sensor module of claim 8, wherein the high pressure bearing endcap is welded to the annular surface of the base.

10. The differential pressure sensor module of claim 1, and further comprising a line pressure sensor operably coupled to one of the first and second fluid passageways.

11. The differential pressure sensor module of claim 10, wherein the line pressure sensor is spaced apart from the differential pressure sensor.

12. The differential pressure sensor module of claim 1, wherein each of the isolation diaphragms has a diameter no larger than about 0.5 inches.

13. The differential pressure sensor module of claim 1, wherein the overpressure protection diaphragm is fluidically coupled to the sensor chamber.

14. The differential pressure sensor module of claim 1, wherein the overpressure protection diaphragm is configured to have a larger displacement than both of the isolation diaphragms.

15. The differential pressure sensor module of claim 1, wherein the overpressure protection diaphragm is disposed proximate one of the process fluid inlets and the differential pressure sensor is disposed proximate the other process fluid inlet.

16. The differential pressure sensor module of claim 1, and further comprising electronics operably coupled to the differential pressure sensor comprising:

a temperature sensor coupled to the electronics; and
a controller configured to provide a temperature-compensated differential pressure output.

17. The differential pressure sensor module of claim 16, and wherein the electronics include a transmitter coupled to the controller and configured to communicate the temperature-compensated differential pressure output in accordance with a process communication protocol.

18. A differential pressure sensor module comprising:
a housing;
a differential pressure sensor disposed within a high side pressure portion within the housing and configured to provide a signal indicative of a difference between a first pressure and a second pressure;
a pair of isolation diaphragms disposed in substantially the same plane, each sealing a respective process fluid pressure inlet in the housing;
a first fluid passageway operably coupled to one of the isolation diaphragms and to the differential pressure sensor;
a second fluid passageway operably coupled to the other of the isolation diaphragms and to the differential pressure sensor, the second fluid passageway containing a fill fluid in fluidic communication with the other of the isolation diaphragms and the sensor chamber; and
an overpressure protection diaphragm operably coupled to the first fluid passageway and the second fluid passageway, wherein the overpressure protection diaphragm is disposed within a low side pressure portion within the housing.

19. The differential pressure sensor module of claim 18, and further comprising a temperature sensor disposed within the housing and configured to provide an indication of temperature within the housing.

20. The differential pressure sensor module of claim 19 and further comprising electronics disposed within the housing and coupled to the temperature sensor and the differential pressure sensor, the electronics being configured to provide a temperature-compensated differential pressure output.

21. The differential pressure sensor module of claim 18, wherein each of the isolation diaphragms has a diameter no larger than about 0.5 inches.

22. The differential pressure sensor module of claim 18, wherein the differential pressure sensor is a silicon strain-gauge differential pressure sensor.

23. The differential pressure sensor module of claim 18, and further comprising a line pressure sensor coupled to one of the first and second passageways.

* * * * *